(12) United States Patent
Kondo et al.

(10) Patent No.: US 7,599,607 B2
(45) Date of Patent: Oct. 6, 2009

(54) INFORMATION PROCESSING APPARATUS AND METHOD, RECORDING MEDIUM, AND PROGRAM

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1078 days.

(21) Appl. No.: 10/431,028

(22) Filed: May 6, 2003

(65) Prior Publication Data

US 2003/0235398 A1    Dec. 25, 2003

(30) Foreign Application Priority Data

May 8, 2002    (JP) .............................. 2002-132817

(51) Int. Cl.
*H04N 7/26* (2006.01)
(52) U.S. Cl. ............................ 386/111; 386/1; 386/113
(58) Field of Classification Search ................. 386/111, 386/1, 113
See application file for complete search history.

(56) References Cited

U.S. PATENT DOCUMENTS

| | | | |
|---|---|---|---|
| 5,488,618 A * | 1/1996 | Kondo et al. ................. | 714/819 |
| 5,499,057 A * | 3/1996 | Kondo et al. ................. | 348/607 |
| 5,517,588 A | 5/1996 | Kondo | |
| 5,797,118 A * | 8/1998 | Saito ........................... | 704/222 |

FOREIGN PATENT DOCUMENTS

| | | |
|---|---|---|
| JP | 5 120798 | 5/1993 |
| JP | 7 99426 | 4/1995 |
| JP | 8 51367 | 2/1996 |
| JP | 11 328679 | 11/1999 |

OTHER PUBLICATIONS

Patent Abstracts of Japan, 61-191431, Aug. 15, 1986.
Patent Abstracts of Japan, 61-182493, Aug. 2, 1986.
Patent Abstracts of Japan, 10-154446, Jun. 3, 1998.
Patent Abstracts of Japan, 08-034412, Jan. 29, 1996.

* cited by examiner

*Primary Examiner*—Thai Tran
*Assistant Examiner*—Girumsew Wendmagegn
(74) *Attorney, Agent, or Firm*—Frommer Lawrence & Haug LLP; William S. Frommer; Thomas F. Presson

(57) ABSTRACT

In an information processing apparatus, for example, a video tape recorder, a recording section records an input signal on a recording medium. Substantially at the same time, a playback section plays back the input signal from the recording medium to output a playback signal. A learning section generates prediction coefficients based on characteristics of the playback signal and the original input signal. Then, when the playback section plays back the input signal recorded on the recording medium to output the playback signal, a classification-adaptation section corrects the playback signal based on the prediction coefficients generated by the learning section, outputting a corrected playback signal.

20 Claims, 10 Drawing Sheets

INFORMATION PROCESSING APPARATUS AND METHOD, RECORDING MEDIUM, AND PROGRAM

BACKGROUND OF THE INVENTION

1. Field of the Invention

The present invention relates to information processing apparatuses and methods, recording media, and programs. More specifically, the present invention relates to an information processing apparatus and method, a recording medium, and a program that allow correction of degradation that occurs during recording and playback of a signal on a recording medium.

2. Description of the Prior Art

Video tape recorders have been known as a type of apparatus that allows recording and playback of an image signal and an associated audio signal (hereinafter referred to as a content signal).

A signal once recorded by a VTR on a recording medium, such as a video tape mounted on the VTR or a hard disk included in the VTR, could be degraded when it is played back, due to disturbance (e.g., noise) during recording, recording characteristics of the VTR or the recording medium, recording method of the VTR or the recording medium, etc.

For example, if a signal of a television broadcasting program (a content signal) is recorded on a video tape by an old VTR, picture and sound are often degraded when the content signal recorded on the video tape is played back by that VTR or another VTR.

Furthermore, if a content signal undergoes various conversions such as quantization and modulation before being recorded on a video tape by a VTR, picture and sound are often degraded when the signal recorded on the video tape is decoded and played back.

These problems are not limited to VTRs, and also arises when image signals, audio signals, etc. are recorded and played back by a DVD (digital versatile disk) recorder, a CD (compact disk) recorder, an MD (mini-disk) recorder, etc.

SUMMARY OF THE INVENTION

The present invention has been made in view of the situation described above, and an object thereof is to allow correction of degradation that occurs during recording and playback of a signal on a recording medium.

The present invention, in one aspect thereof, provides an information processing apparatus including a learning section for generating, based on a first signal before recording thereof on a recording medium and a second signal obtained by playing back the first signal that has been recorded on the recording medium, coefficients for correcting the second signal.

The information processing apparatus may further include a recording section for recording the first signal on the recording medium; a playback section for playing back the first signal recorded on the recording medium to output the second signal; and a coefficient recording section for recording the coefficients.

The information processing apparatus may further include an index attaching section for attaching an associated index to the coefficients generated by the learning section and to the first signal associated with the coefficients.

The information processing apparatus may further include a correcting section for correcting the second signal based on the coefficients generated by the learning section and to which the index associated with the first signal has been attached by the index attaching section, when the first signal recorded on the recording medium is played back to output the second signal after the coefficients have been generated by the learning section.

The information processing apparatus may further include a recording section for recording the first signal and the index on the recording medium; and a playback section for playing back the first signal from the recording medium to output the second signal.

The information processing apparatus may further include a playback control section for exercising control so that, when the first signal has been recorded on the recoding medium by a first information processing apparatus, the first information processing apparatus immediately plays back the first signal recorded on the recording medium.

The information processing apparatus may further include a correcting section for correcting the second signal played back by a second information processing apparatus, based on the coefficients generated by the learning section, when the first signal recorded by the first information processing apparatus is played back from the recording medium by the second information processing apparatus after the prediction coefficients have been generated by the learning section.

In the information processing apparatus, the first information processing apparatus and the second information processing apparatus may be implemented as a single information processing apparatus that is capable of both recording and playing back a signal.

In the information processing apparatus, the learning section may include a class determining section for determining a class of the second signal; an equation generating section for generating equations associated with the class determined by the class determining section; a coefficient calculating section for calculating the coefficients based on the equations generated by the equation generating section; and a coefficient storing section for storing the coefficients calculated by the coefficient calculating section.

In the information processing apparatus, the prediction coefficients in the coefficient storing section may be stored in association with the class.

The information processing apparatus may further include a correcting section for correcting the second signal when the first signal recorded on the recording medium is output as the second signal by the playback section after the coefficients have been generated by the learning section, wherein the correcting section include a class determining section for determining a class of the second signal; a coefficient reading section for reading the coefficients associated with the class determined by the class determining section from the coefficient storing section; and a calculating section for performing a calculation using the coefficients that have been read and the second signal to generate a third signal.

The present invention, in another aspect thereof, provides an information processing method for an information processing apparatus, including a learning step of generating, based on a first signal before recording thereof on a recording medium and a second signal obtained by playing back the first signal that has been recorded on the recording medium, coefficients for correcting the second signal.

The information processing method may further include a recording step of recording the first signal on the recording medium; a playback step of playing back the first signal recorded on the recording medium to output the second signal; and a coefficient recording step of recording the coefficients.

The information processing method may further include a correcting step of correcting the second signal based on the coefficients generated in the learning step, when the first signal recorded on the recording medium is played back to output the second signal after the coefficients have been generated in the learning step.

The present invention, in another aspect thereof, provides a recording medium having recorded thereon a program for a computer that controls an information processing apparatus, the program including a learning step of generating, based on a first signal before recording thereof on a recording medium and a second signal obtained by playing back the first signal that has been recorded on the recording medium, coefficients for correcting the second signal.

In the recording medium, the program may further include a correcting step of correcting the second signal based on the coefficients generated in the learning step, when the first signal recorded on the recording medium is played back to output the second signal after the coefficients have been generated in the learning step.

The present invention, in another aspect thereof, provides a program for a computer that controls an information processing apparatus, the program including a learning step of generating, based on a first signal before recording thereof on a recording medium and a second signal obtained by playing back the first signal that has been recorded on the recording medium, coefficients for correcting the second signal.

The program may further include a correcting step of correcting the second signal based on the coefficients generated in the learning step, when the first signal recorded on the recording medium is played back to output the second signal after the coefficients have been generated in the learning step.

According to the information processing apparatus and method, recording medium, and program, coefficients for correcting the second signal are generated based on the first signal before recording thereof on the recording medium and the second signal obtained by playing back the first signal recorded on the recording medium. Then, the second signal is corrected based on the coefficients generated in the learning step, when the first signal recorded on the recording medium is played back to output the second signal after the coefficients have been generated in the learning step.

The information processing apparatus may be an apparatus that processes information recorded or played back by itself, or an apparatus that processes information recorded or played back by another information processing apparatus. The information processing apparatus may also be an apparatus that processes both information recorded or played back by itself and another information processing apparatus.

The present invention, in another aspect thereof, provides an information processing apparatus including a correcting section for detecting coefficients generated in advance based on a first signal and a second signal and correcting the second signal based on the coefficients detected, when the first signal is played back to output the second signal after the first signal has been recorded on a recording medium.

In the information processing apparatus, an index for associating the first signal and the coefficients with each other may be further recorded on the recording medium, and wherein the correcting section detects the coefficients associated with the first signal based on the index and corrects the second signal based on the coefficients detected.

In the information processing apparatus, the correcting section may include a class determining section for determining a class of the second signal; a coefficient detecting section for detecting the coefficients associated with the class determined by the class determining section; and a calculating section for performing a calculation needed to correct the second signal, based on the coefficients detected by the coefficient detecting section.

The present invention, in another aspect thereof, provides an information processing method for an information processing apparatus, including a correcting step of detecting coefficients generated in advance based on a first and a second signal and correcting the second signal based on the coefficients detected, when the first signal is played back to output the second signal after the first signal has been recorded on a recording medium.

The present invention, in another aspect thereof, provides a recording medium having recorded thereon a program for a computer that controls an information processing apparatus, the program including a correcting step of detecting coefficients generated in advance based on a first and a second signal and correcting the second signal based on the coefficients detected, when the first signal is played back to output the second signal after the first signal has been recorded on a recording medium.

The present invention, in another aspect thereof, provides a program for a computer that controls an information processing apparatus, the program including a correcting step of detecting coefficients generated in advance based on a first and a second signal and correcting the second signal based on the coefficients detected, when the first signal is played back to output the second signal after the first signal has been recorded on a recording medium.

According to the information processing apparatus and method, recording medium, and program defined above, coefficients generated in advance based on a first and a second signal are detected and the second signal are corrected based on the coefficients detected, when the first signal is played back to output the second signal after the first signal has been recorded on a recording medium.

The information processing apparatus may be an apparatus that processes information recorded or played back by itself, or an apparatus that processes information recorded or played back by another information processing apparatus. The information processing apparatus may also be an apparatus that processes both information recorded or played back by itself and another information processing apparatus.

According to the present invention, recording and playback of information is allowed, and degradation that occurs during recording or playback of a signal on a recording medium is corrected. That is, recorded information is accurately playback substantially as it has been before recording thereof.

DESCRIPTION OF THE PREFERRED EMBODIMENTS

Figure 1:
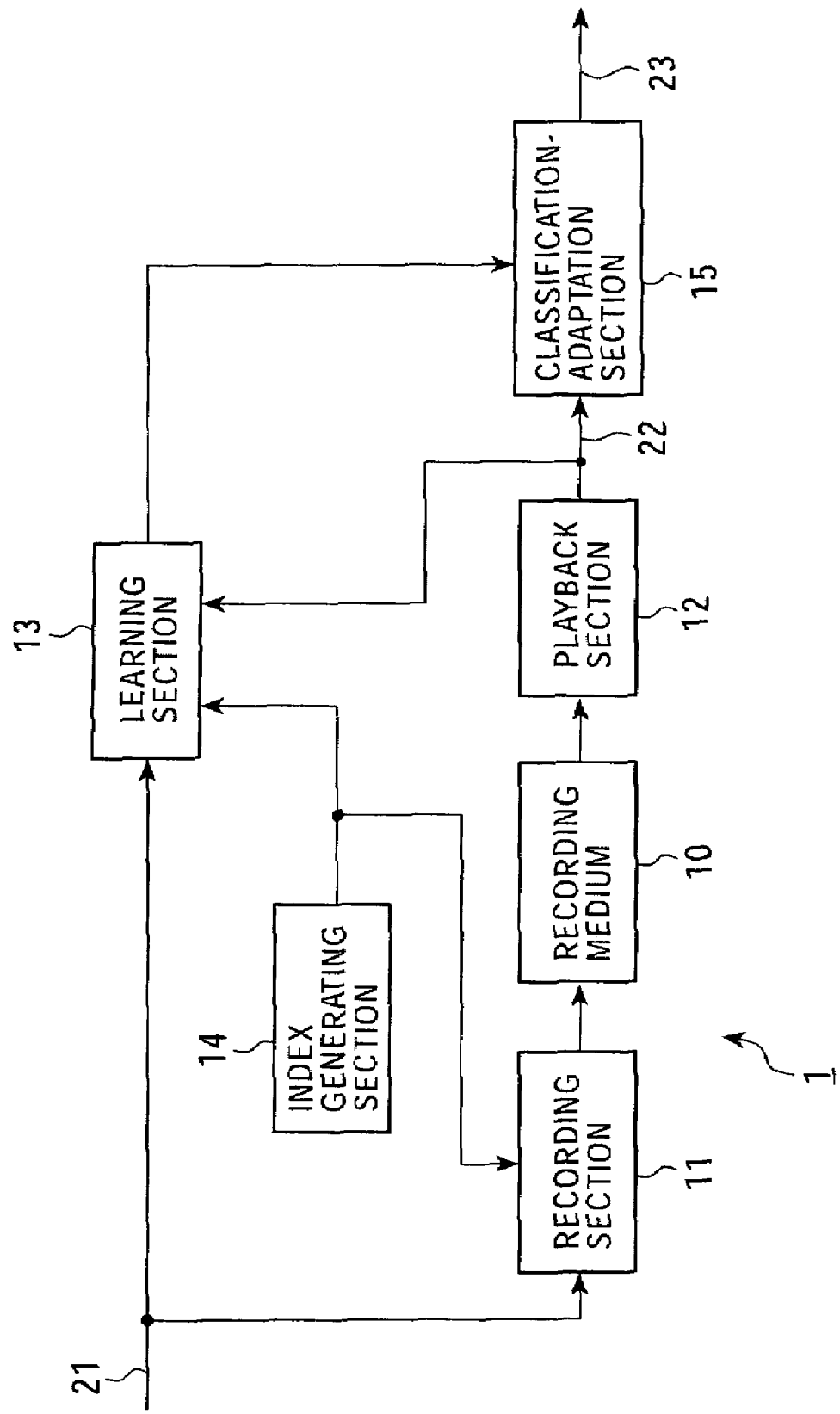
FIG. 1 is a block diagram showing an example configuration of a recording/playback apparatus according to an embodiment of the present invention.

FIG. 1 shows an example configuration of a recording/playback apparatus, which is an information processing apparatus according to an embodiment of the present invention.

Referring to FIG. 1, a recording/playback apparatus 1 includes a recording section 11, a playback section 12, and a learning section 13. The recording section 11 records an input signal 21 on a recording medium 10. The playback section 12 plays back the input signal 21 recorded on the recording medium 10 by the recording section 11 to thereby output a playback signal 22. The learning section 13, based on the original input signal 21 and the corresponding playback signal 22 yielded by playing back the original input signal 21 substantially at the same time as it is recorded on the recording medium 10 by the recording section 11, generates coefficients for predicting the original input signal 21 from the playback signal 22 that is output subsequently and correcting the playback signal 22 approximately into the original input signal 21 (hereinafter referred to as prediction coefficients).

As will be described later, the learning section 13 stores the prediction coefficients generated in an internal memory (e.g., a coefficient storing section 37 shown in FIG. 2 and described later).

The recording/playback apparatus 1 further includes a classification-adaptation section 15. When the playback section 12 plays back the input signal 21 recorded on the recording medium 10 to output the playback signal 22 after the prediction coefficients associated with the input signal 21 are generated and stored, the classification-adaptation section 15 corrects the playback signal 22 based on the prediction coefficients supplied from the learning section 13 to output a corrected playback signal 23.

The recording/playback apparatus 1 further includes an index generating section 14. The index generating section 14 generates an index associated with the input signal 21 recorded on the recording medium 10 by the recording section 11, and with the prediction coefficients associated with the input signal 21, generated and stored by the learning section 13.

The learning section 13 stores, in an internal memory (e.g., a coefficient storing section 37 shown in FIG. 2 and described later), prediction coefficients in association with the index generated by the index generating section 14. The recording section 11 records, on the recording medium 10, the input signal 21 in association with the index generated by the index generating section 14.

The input signal 21 is not limited to a particular type of signal. In this embodiment, as an example, the input signal 21 is assumed to be a content signal including an image signal and an audio signal. The content signal (the input signal 21) may be either an analog signal or a digital signal.

Furthermore, the recording method of the recording section 11 is not limited to a particular method. For example, the recording section 11 may record the content signal (the input signal 21) as it is, or execute various conversion processes such as quantization and modulation before recording the content signal.

Furthermore, the recording medium 10, on which the content signal is recorded by the recording section 11, is not limited to a particular type of medium. For example, the recording medium 10 may be a video tape, a hard disk, or a semiconductor memory.

The playback section 12 is capable of playing back the content signal recorded by the recording section 11, in accordance with characteristics and recording method of the recording section 11.

Figure 2:
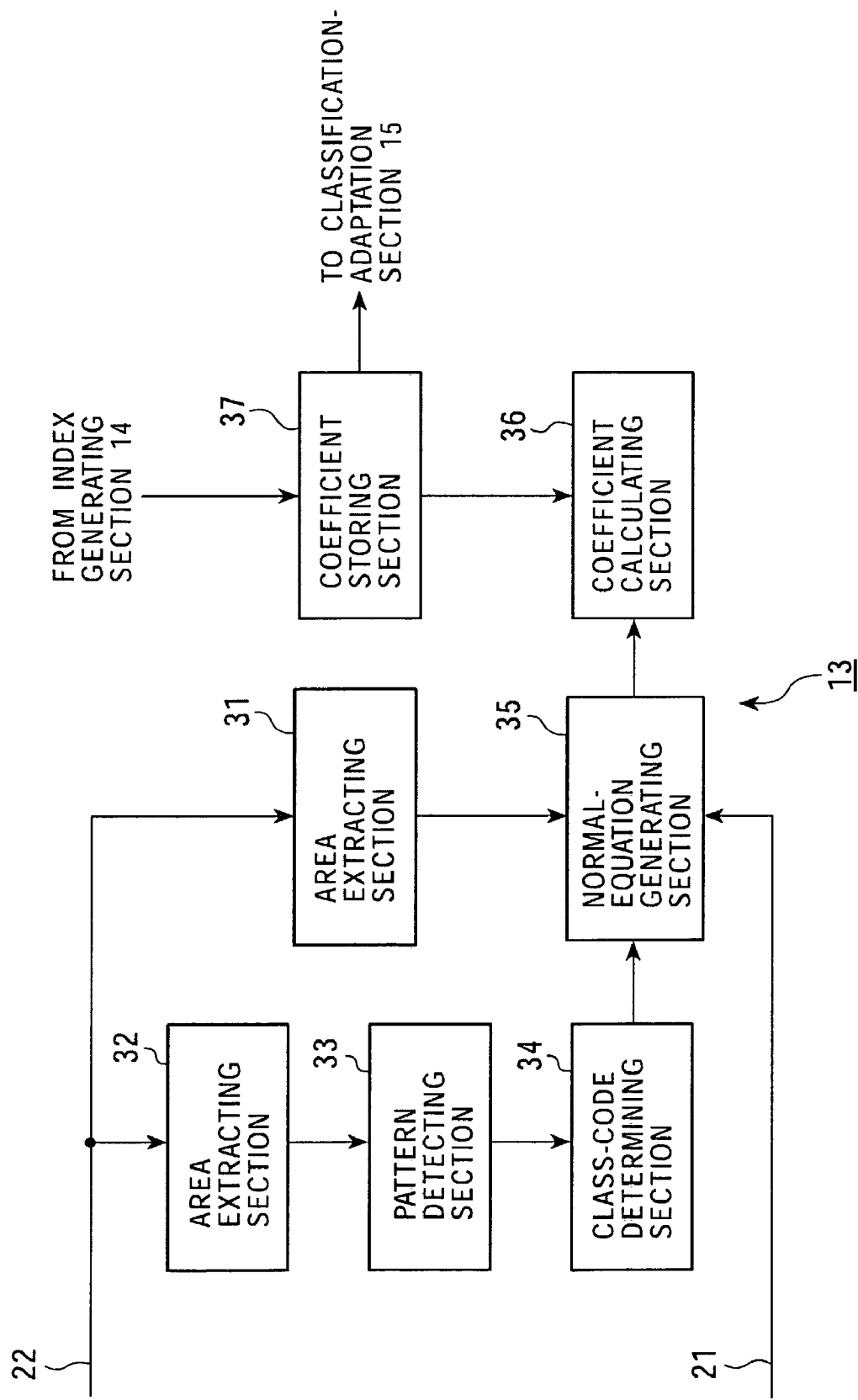
FIG. 2 is a block diagram showing in detail an example configuration of a learning section of the recording/playback apparatus shown in FIG. 1.

FIG. 2 shows in detail an example configuration of the learning section 13 shown in FIG. 1.

Referring to FIG. 2, the learning section 13 includes an area extracting section 32, a pattern detecting section 33, and a class-code determining section 34. The area extracting section 32 extracts information needed to classify the playback signal 22 (the signal played back after the input signal 21 is recorded on the recording medium 10). For example, if the input signal 21 is an image signal, the area extracting section 32 extracts pixels that are used to determine a class, which are referred to as class taps. The pattern detecting section 33 detects a pattern of the playback signal 22 based on the information extracted by the area extracting section 32. The class-code determining section 34 determines a class (a class code associated with the class) of the playback signal 22 based on the pattern detected by the pattern detecting section 33.

The learning section 13 further includes an area extracting section 31 and a normal-equation generating section 35. The area extracting section extracts information needed to predictively generate an output signal in which degradation has been corrected, i.e., a signal that is most approximate to the input signal 21, from the playback signal 22. For example, if the input signal 21 is an image signal, the area extracting section 31 extracts pixels that are used to generate prediction coefficients, which are referred to as prediction taps. The normal-equation generating section 36 generates normal equations for each class (class code) determined by the class-code determining section 34, based on the input signal 21 serving as first training data and the playback signal 22 (the signal extracted by the area extracting section 31) serving as second training data. The first training data and the second training data have different qualities. For example, assuming a case of image data, the first training data has a high picture quality whereas the second training data has a low picture quality. The first training data and the second training data constitute a training set.

Furthermore, the learning section 13 includes a coefficient calculating section 36 and a coefficient storing section 37. The coefficient calculating section 37, upon receiving a predetermined number of normal equations from the normal-equation generating section-35, solves the normal equations to generate prediction coefficients associated with each class (class code). The coefficient storing section 37 stores a plurality of prediction coefficients (a prediction-coefficient set) generated by the coefficient calculating section 36.

As described earlier, the coefficient storing section 37 stores the prediction coefficients in association with an index supplied from the index generating section 14.

Now, a method of determining a class code will be described. Assuming that the playback signal 22 is an image signal, a simplest method of determining a class code is to use a bit sequence of learning data (the playback signal 22) in a block composed of a predetermined number of pixels (the area extracted by the area extracting section 32) as a class code. This method, however, requires an enormous amount of memory.

Thus, in this embodiment, the area extracting section 32, the pattern detecting section 33, and the class-code determining section 34 executes adaptive dynamic range coding (ADRC) for determining a class code based on a signal pattern of the playback signal 22.

ADRC is an adaptive re-quantization method originally developed for efficient coding for VTR, and it allows efficient representation of a local pattern of signal levels in a short word length. Assuming that the area extracting section 32 extracts a block of pixels from the playback signal 22, the levels of the 3×3 pixels a to i will be denoted as x1 to x9, respectively. Furthermore, re-quantization data obtained by performing p-bit ADRC on the data of x1 to x9 will be denoted as q1 to q9, respectively. The dynamic range will be denoted by DR, a maximum value by MAX, and a minimum value by MIN. Then, a class of the block is defined by equation (1) below:

$$\text{class} = \sum_{i=1}^{3} q_i (2^p)^i \qquad (1)$$

Figure 3:
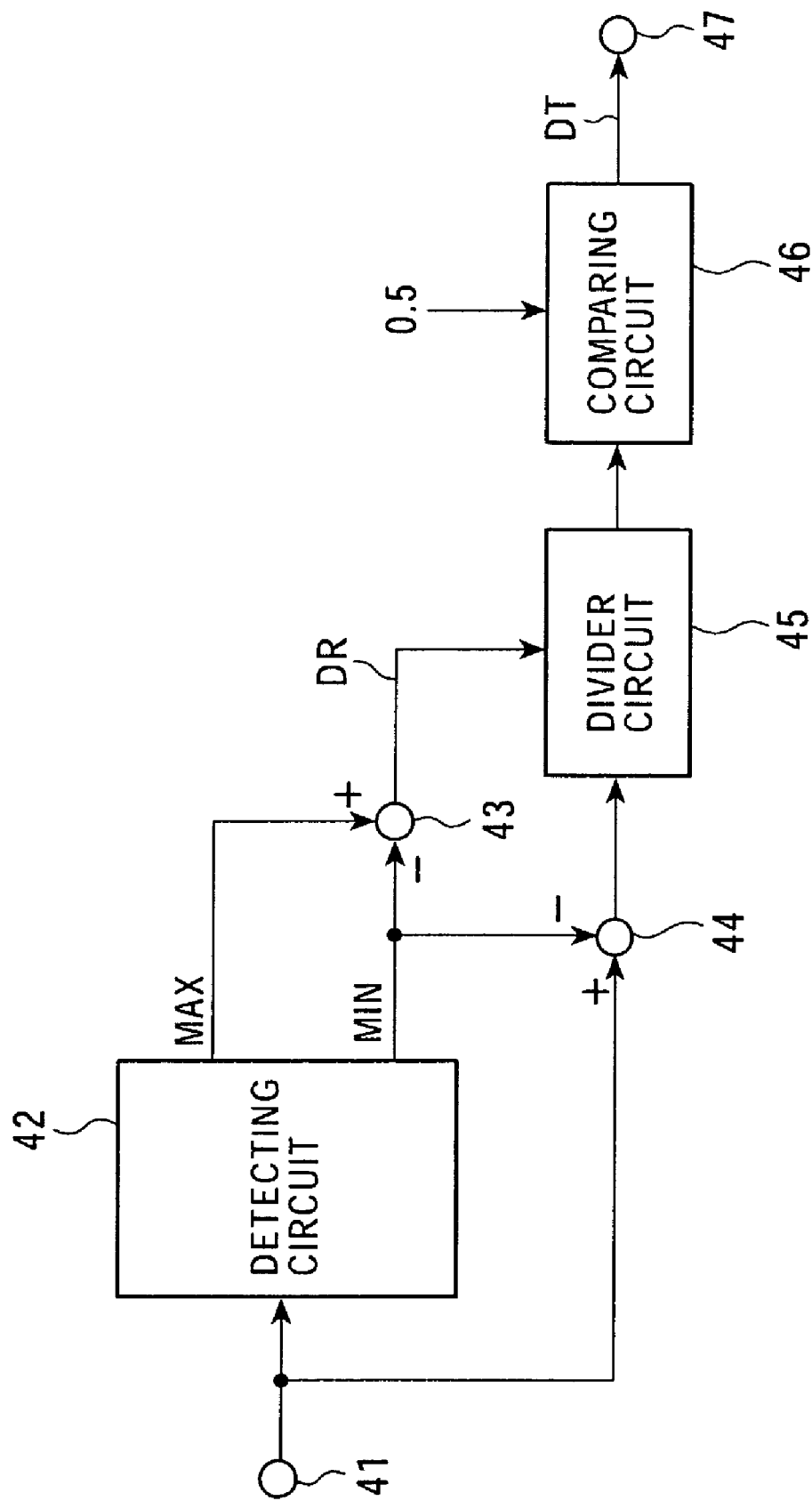
FIG. 3 is a block diagram for explaining an adaptive-dynamic-range-coding circuit.

Now, ADRC will be described in the context of 1-bit ADRC as an example. FIG. 3 shows an example of the pattern detecting section 33 and the class-code determining section 34 forming an ADRC circuit. Referring to FIG. 3, with regard to the playback signal 22 converted in an order of blocks (areas extracted by the area extracting section 32) from an input terminal 41, a detecting circuit 42 detects a maximum value MAX and a minimum value MIN for each of the blocks. A subtractor circuit 43 receives input of the maximum value MAX and the minimum value MIN, and outputs a dynamic range DR. A subtractor circuit 44 receives input of the input data and the minimum value MIN, and subtracts the minimum value MIN from the input data to generate normalized pixel data.

A divider circuit 45 receives the dynamic range DR and the normalized pixel data, and divides the normalized pixel data by the dynamic range DR, outputting the results to a comparing circuit 46. The comparing circuit 46 determines whether each of the results of divisions relating to eight pixels other than the center pixel is larger or smaller than 0.5. According to the results, data DT of "0"s and "1"s is generated. The comparison output DT is output from an output terminal 47. By generating a class code by 1-bit ADRC described above, a class of a block composed of 3×3 pixels of the playback signal 22 is represented by a 9-bit class code. The class code generated as described above is input to the normal-equation generating section 35.

Next, processing in the normal-equation generating section 35, to which the class code is input, and processing in the coefficient calculating section 36 will be described in detail.

As an example, calculation of corrected values E[y] of pixel values y of the input signal 21 serving as first training data by a linear first-order coupling model defined by linear coupling of pixel values x1, x2, . . . of the playback signal 22 serving as second training data (hereinafter referred to as learning data) and predetermined prediction coefficients w1, w2, . . . will be considered. In this case, the corrected values E[y] can be expressed by equation (2) below:

$$E[y] = w1 \times x1 + w2 \times x2 + \ldots \qquad (2)$$

For the purpose of generalization, a matrix W composed of a set of prediction coefficients w, a matrix X composed of a set of learning data, and a matrix Y' composed of a set of corrected values E[y] are defined as follows:

$$X = \begin{pmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{pmatrix}$$

$$W = \begin{pmatrix} W_1 \\ W_2 \\ \cdots \\ W_n \end{pmatrix}, Y' = \begin{pmatrix} E[y_1] \\ E[y_2] \\ \cdots \\ E[y_m] \end{pmatrix}$$

Then, an observation equation expressed in equation (3) below is derived:

$$XW = Y' \qquad (3)$$

The corrected values E[y] approximate to the pixel values y of the input signal 21 are calculated by applying the least-square method to the observation equation. In this case, let the matrix Y composed of the pixel values y of the input signal 21, and a matrix E composed of a set of residuals e of the corrected values E[y] with respect to the pixel values y of the input signal 21 be defined as follows:

$$E = \begin{pmatrix} e_1 \\ e_2 \\ \cdots \\ e_m \end{pmatrix}, Y = \begin{pmatrix} y_1 \\ y_2 \\ \cdots \\ y_m \end{pmatrix}$$

Then, a residual equation expressed in equation (4) below is derived.

$$XW = Y + E \qquad (4)$$

In this case, prediction coefficients wi for calculating the corrected values E[y] approximate to the pixel values y of the input signal 21 can be calculated by minimizing a square error defined as:

$$\sum_{i=1}^{m} e_i^2$$

Thus, optimal values for obtaining the corrected values E[y] approximate to the pixel values y of the input signal 21 are prediction coefficients wi that satisfy equation (5) below, i.e., prediction coefficients wi with respect to which differentiation of the square error becomes 0:

$$e_1 \frac{\partial e_1}{\partial w_i} + e_2 \frac{\partial e_2}{\partial w_i} + \cdots + e_m \frac{\partial e_m}{\partial w_i} = 0 \ (i = 1, 2, \cdots, n) \qquad (5)$$

First, differentiating equation (4) with respect to prediction coefficients wi yields equation (6) below:

$$\frac{\partial e_1}{\partial w_i} = x_{i1}, \frac{\partial e_i}{\partial w_2} = x_{i2}, \cdots, \frac{\partial e_i}{\partial w_n} = x_{in}, (i = 1, 2, \cdots, m) \quad (6)$$

From equations (5) and (6), equation (7) below is derived:

$$\sum_{i=1}^{m} e_i x_{i1} = 0, \sum_{i=1}^{m} e_i x_{i2} = 0, \cdots \sum_{i=1}^{m} e_i x_{in} = 0 \quad (7)$$

Furthermore, based on the relationship among the learning data x, the prediction coefficients w, the first training data y, and the residual e in the residual equation expressed in equation (4), normal equations in equations (8) are derived from equation (7):

$$\begin{cases} (\sum_{i=1}^{m} x_{i1}x_{i1})w_1 + (\sum_{i=1}^{m} x_{i1}x_{i2})w_2 + \cdots + (\sum_{i=1}^{m} x_{i1}x_{in})w_n = (\sum_{i=1}^{m} x_{i1}y_i) \\ (\sum_{i=1}^{m} x_{i2}x_{i1})w_1 + (\sum_{i=1}^{m} x_{i2}x_{i2})w_2 + \cdots + (\sum_{i=1}^{m} x_{i2}x_{in})w_n = (\sum_{i=1}^{m} x_{i2}y_i) \\ \cdots \\ (\sum_{i=1}^{m} x_{in}x_{i1})w_1 + (\sum_{i=1}^{m} x_{in}x_{i2})w_2 + \cdots + (\sum_{i=1}^{m} x_{in}x_{in})w_n = (\sum_{i=1}^{m} x_{in}y_i) \end{cases} \quad (8)$$

The normal equations in equations (8) can be derived as many as the number of prediction coefficients w to be obtained. Thus, by solving equations (8) (note, however, that a matrix composed of coefficients applied to the prediction coefficients w must be regular in order to solve equations (8)), optimal prediction coefficients w are obtained. Equations (8) can be solved, for example, by the sweeping method (Gauss-Jordan elimination).

By executing the processing described above in the normal-equation generating section 35 and the coefficient calculating section 36, optimal prediction coefficients w are obtained, which are stored in the coefficient storing section 37. The corrected values E[y] approximate to the pixel values y of the input signal 21 can be obtained according to equation (2) using the prediction coefficients w.

Figure 4:
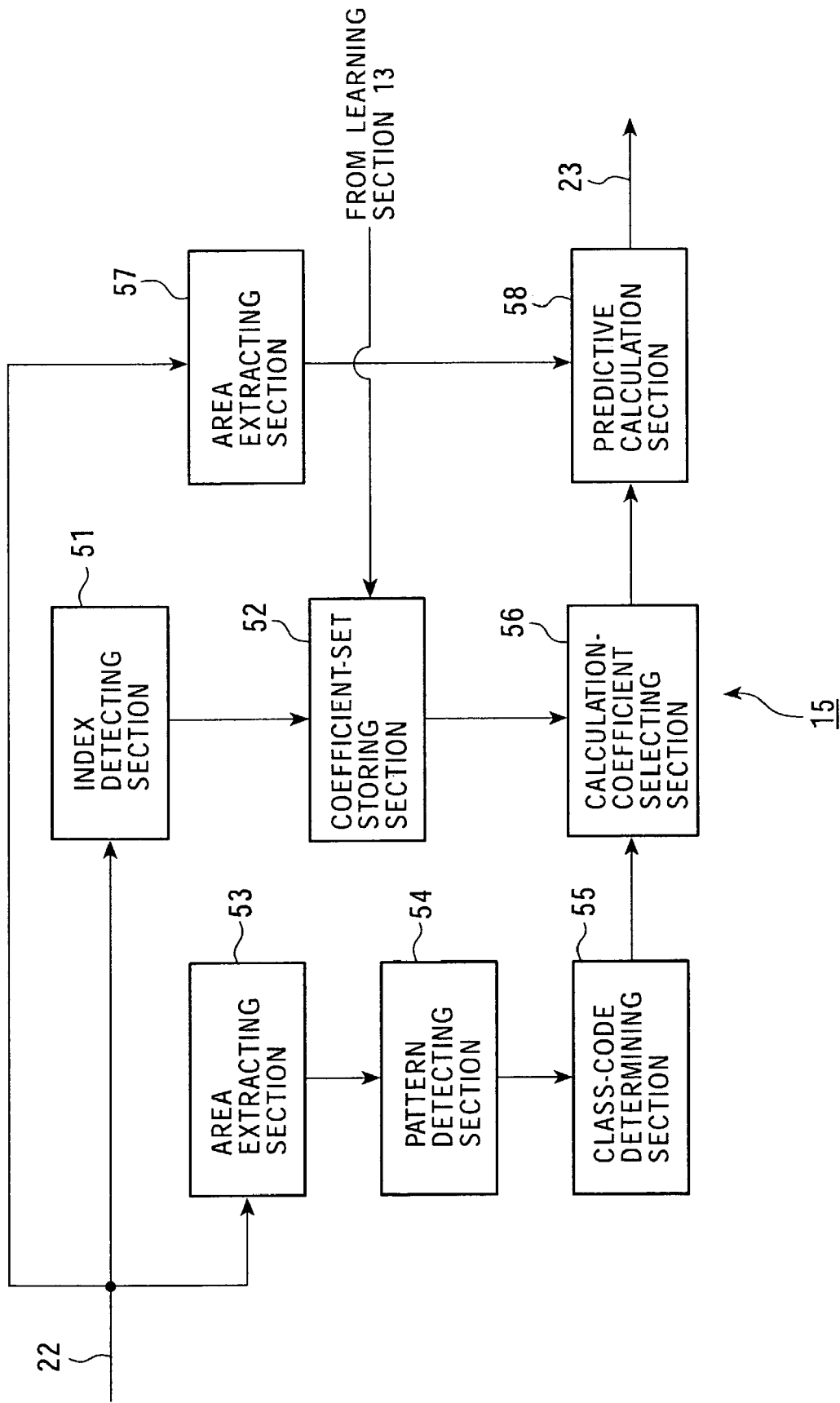
FIG. 4 is a block diagram showing in detail an example configuration of a classification-adaptation section of the recording/playback apparatus shown in FIG. 1.

FIG. 4 shows in detail an example configuration of the classification-adaptation section 15, shown in FIG. 1, for executing a classification-adaptation process.

As shown in FIG. 4, the classification-adaptation section 15 includes an index detecting section 51 and a coefficient-set storing section 52. The index detecting section 51 detects an index from the playback signal (including the index attached thereto) 22. The coefficient-set storing section 52 stores a plurality of prediction-coefficient sets supplied from the learning section 13, i.e., from the coefficient storing section 37 shown in FIG. 2. The coefficient-set storing section 52, when an index is supplied from the index detecting section 51, reads a prediction-coefficient set associated with the index, and supplies the prediction-coefficient set to a calculation-coefficient selecting section 56.

The classification-adaptation section 15 further includes an area extracting section 53, a pattern detecting section 54, and a class-code determining section 55. The area extracting section extracts information needed to classify the playback signal 22 (e.g., class taps if the playback signal 22 is an image signal). The pattern detecting section 54 detects a pattern of the playback signal 22 based on the information extracted by the area extracting section 53. The class-code determining section 55 determines a class of the playback signal (a class code associated with the class) based on the pattern detected by the pattern detecting section 54.

The class code mentioned above in relation to FIG. 4 can also be obtained by ADRC similar to the class code mentioned earlier in relation to FIGS. 2 and 3.

The classification-adaptation section 15 further includes a calculation-coefficient selecting section 56, an area extracting section 57, and a predictive calculation section 58. The calculation-coefficient selecting section 56 stores a plurality of prediction coefficients included in the prediction-coefficient set supplied from the prediction-coefficient storing section 52, and selects prediction coefficients associated with the class (class code) determined by the class-code determining section 55. The area extracting section 57 extracts information needed to predictively generate an output signal in which degradation has been corrected (a signal that is most approximate to the input signal 21) from the playback signal 22. For example, if the playback signal 22 is an image signal, the area extracting section 57 extracts prediction taps. The predictive calculation section 58 performs a predictive calculation using the information supplied from the area extracting section 57 and the prediction coefficients supplied from the calculation-coefficient selecting section 56 to generate a corrected playback signal (an output signal in which degradation has been corrected) 23, outputting the corrected playback signal 23 to the outside. That is, the predictive calculation section 58 corrects the playback signal 22.

If the playback signal 22 is an image signal, prediction coefficients w1 to wn (e.g., n=9) associated with the class code determined are output from the calculation-coefficient selecting section 56. The predictive calculation section 58 calculates, according to equation (2) given earlier, the corrected values E[y] from data of a block extracted by the area extracting section 57 and the prediction coefficients w1 to wn, and outputs the corrected values E[y] as a corrected playback signal 23.

Hereinafter, prediction coefficients selected by the calculation-coefficient selecting section 56 will be referred to as calculation coefficients.

Figure 5:
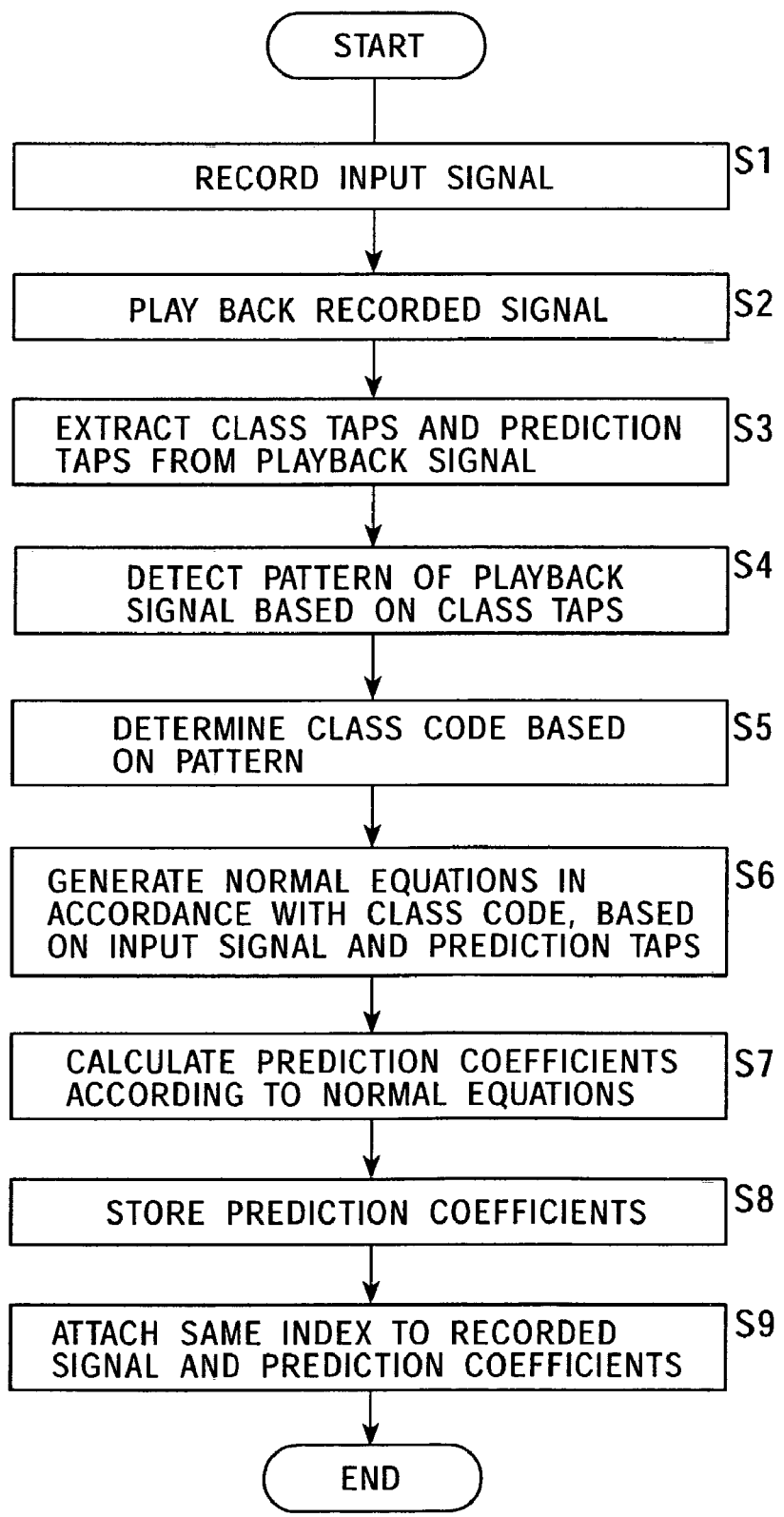
FIG. 5 is a flowchart showing a recording process executed by the recording/playback apparatus shown in FIG. 1.
Figure 6:
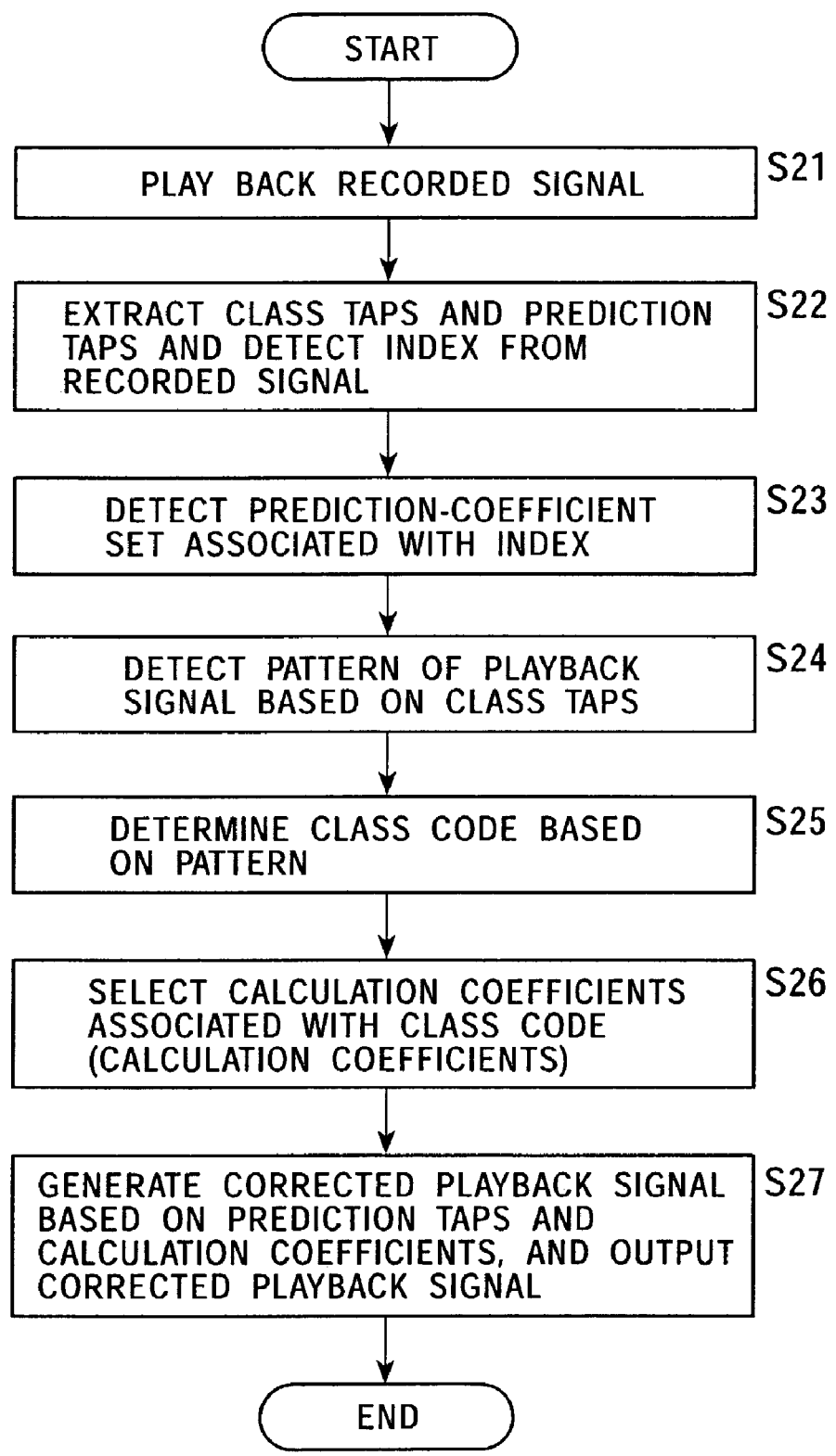
FIG. 6 is a flowchart showing a playback process executed by the recording/playback apparatus shown in FIG. 1.

Next, processes executed by the recording/playback apparatus 1 shown in FIG. 1 will be described with reference to flowcharts shown in FIGS. 5 and 6. FIG. 5 is a flowchart showing a recording process executed by the recording/playback apparatus 1. FIG. 6 is a flowchart showing a playback process executed by the recording/playback apparatus 1.

First, a recording process executed by the recording/playback apparatus 1 will be described with reference to the flowchart shown in FIG. 5.

Let it be supposed that, for example, an image signal is input from outside to the recording/playback apparatus 1, shown in FIG. 1, as the input signal 21.

In step S1, the recording section 11 records the input signal 21 on the recording medium 10. Immediately thereafter (substantially at the same time), in step S2, the playback section 12 plays back the recorded signal (the input signal 21 recorded on the recording medium 10) to output a playback signal 22 to the learning section 13.

In step S3, the learning section 13 extracts class taps and prediction taps from the playback signal 22 supplied thereto.

More specifically, referring to FIG. 2, the playback signal 22 is supplied to the area extracting section 31 and to the area extracting section 32. The area extracting section 32 extracts class taps from the playback signal 22 supplied thereto, and outputs the class taps to the pattern detecting section 33. The area extracting section 31 extracts prediction taps from the playback signal 22 supplied thereto, and outputs the prediction taps to the normal-equation generating section 35.

In step S4, the pattern detecting section 33 detects a pattern of the playback signal 22 based on the class taps supplied from the area extracting section 32, and outputs the pattern to the class-code determining section 34.

In step S5, the class-code determining section 34 determines a class code based on the pattern of the playback signal 22 supplied thereto, and outputs the class code to the normal-equation generating section 35. More specifically, the class-code determining section 34 determines a class based on the pattern of the playback signal 22 supplied thereto, and outputs a class code associated with the class to the normal-equation generating section 35.

In step S6, the normal-equation generating section 35 generates normal equations for each class code determined by the class-code determining section 34 in step S5, based on the input signal 21 serving as first training data and based on the prediction taps extracted by the area extracting section 31 in step S3, serving as second training data, and outputs the normal equations to the coefficient calculating section 36.

In step S7, the coefficient calculating section 36 calculates prediction coefficients according to the normal equations generated by the normal-equation generating section 35 in step S6, and outputs the prediction coefficients to the coefficient storing section 37.

More specifically, as described earlier, the coefficient calculating section 36, upon receiving a predetermined number of normal equations from the normal-equation generating section 35, solves the normal equations to calculate prediction coefficients associated with each class code (class) determined by the class-code determining section 34 in step S5. The method of solving the normal equation is not limited to a particular method. In this embodiment, for example, the normal equations are solved using the least-square method.

In step S8, the coefficient storing section 37 stores the prediction coefficients supplied from the coefficient calculating section 36 (as a prediction-coefficient set).

In step S9, the index generating section 14 shown in FIG. 1 attaches the same index to the recorded signal (the input signal 21 recorded on the recording medium 10 by the recording section 11) and to the prediction coefficients stored in the learning section 13, i.e., in the coefficient storing section 37 shown in FIG. 2.

In other words, in this embodiment, for example, the recording section 11 records on the recording medium 10 an index generated for the input signal 21 by the index generating section 14. The learning section 13, i.e., the coefficient storing section 37, stores the index generated by the index generating section 14 in association with the prediction-coefficient set.

The prediction-coefficient set calculated by the process described above may be calculated for each predetermined unit of the input signal 21 (e.g., an image signal corresponding to one frame of image), or a single prediction-coefficient set may be calculated for the entire information composed of the input signal 21 (e.g., a television broadcasting program).

For example, in the latter case, the recording section 11 records the input signal 21 of a television broadcasting program, and attaches an index "k (k is an arbitrary integer)" to the prediction-coefficient set learned from the input signal 21 of the television broadcasting program (prediction coefficients associated with each class), and attaches the same index "k" to the input signal 21 of the television broadcasting program.

As will be described later, when the input signal 21 of the television broadcasting program is played back, the corresponding playback signal 22 is corrected using a prediction-coefficient set with an index "k" attached thereto.

Although prediction coefficients are stored in this example in the coefficient storing section 37 shown in FIG. 2, prediction coefficients may be stored in other places as long as the prediction coefficients can be obtained when the input signal 21 recorded on the recording medium 10 is played back. For example, prediction coefficients may be stored within the playback section 12 shown in FIG. 1. More specifically, for example, prediction coefficients calculated by the coefficient calculating section 36 shown in FIG. 2 may be directly stored in the coefficient-set storing section 52 shown in FIG. 4. Alternatively, prediction coefficients associated with the input signal 21 may be recorded on the recording medium 10 when the input signal 21 is recorded on the recording medium 10.

Next, a playback process executed by the recording/playback apparatus 1 shown in FIG. 1 will be described with reference to the flowchart shown in FIG. 6.

Now, let it be assumed, as an example, that an image signal of a television broadcasting program (i.e., the input signal 21) has already been recorded on the recording medium 10 by the recording section 11 shown in FIG. 1, and that a prediction-coefficient set associated with the image signal of the television broadcasting program (i.e., a set composed of prediction coefficients associated with each class) has already been generated by the learning section 13 shown in FIG. 1 and stored in the coefficient-set storing section 52 of the classification-adaptation section 15 shown in FIG. 4, according to the flowchart shown in FIG. 5.

Furthermore, in this example, it is assumed that the same index "3" is attached to the image signal of the television broadcasting program (i.e., the input signal 21) and the prediction-coefficient set associated therewith.

That is, in this example, the coefficient-set storing section 52 at least stores a prediction-coefficient set having an index "3", and the image signal of the television broadcasting program (i.e., the input signal 21) having an index of "3" is recorded on the recording medium 10.

Let it be supposed that a user has requested playback of the television broadcasting program associated with the index "3" (via a requesting section not shown). In step S21, the playback section 12 shown in FIG. 1 plays back the recorded signal recorded on the recording medium 10 (i.e., the input signal 21 associated with the index "3"). That is, the playback section 12 plays back the input signal 21 from the recording medium 10 to output a playback signal 22 to the classification-adaptation section 15.

In step S22, the classification-adaptation section 15 extracts class taps and prediction taps from the playback signal 22 supplied thereto, and detects the index "3" attached to the playback signal 22.

More specifically, as shown in FIG. 4, the playback signal 22 is supplied to the area extracting section 53, the area extracting section 57, and to the index detecting section 51. The area extracting section 53 extracts class taps from the playback signal 22, and supplies the class taps to the pattern detecting section 54. The area extracting section 57 extracts prediction taps from the playback signal 22, and supplies the prediction taps to the predictive calculation section 58. The index detecting section 51 detects the index "3" attached to the playback signal 22, and supplies the index "3" to the coefficient-set storing section 52.

In step S23, the coefficient-set storing section 52 detects and reads a prediction-coefficient set associated with the index detected by the index detecting section 51 in step S22, i.e., a prediction-coefficient set with an index "3", from among prediction-coefficient sets having been stored up to that time, and supplies the prediction-coefficient set to the calculation-coefficient selecting section 56.

In step S24, the pattern detecting section 54 detects a pattern of the playback signal 22 based on the class taps extracted by the area extracting section 53 in step S22, and supplies the pattern to the class-code determining section 55.

In step S25, the class-code determining section 55, as described earlier, determines a class based on the pattern of the playback signal 22, and supplies a class code associated with the class to the calculation-coefficient selecting section 56.

In step S26, the calculation-coefficient selecting section 56 selects prediction coefficients associated with the class code (class) determined in step S25 by the class-code determining section 55 (i.e., calculation coefficients) from the prediction-coefficient set detected by the coefficient-set storing section 52 (the prediction-coefficient set associated with the index "3"), and supplies the calculation coefficients to the predictive calculation section 58.

In step S27, the predictive calculation section 58 generates a corrected playback signal 23 corresponding to the playback signal 22, i.e., corrects the playback signal 22 into a corrected playback signal 23, based on the prediction taps extracted by the area extracting section 57 in step S22 and the calculation coefficients selected by the calculation-coefficient selecting section 56 in step S26, and outputs the corrected playback signal 23 to the outside.

The steps in the flowcharts shown in FIGS. 5 and 6 need not necessarily be executed sequentially in the order described above, and may be executed in parallel or individually.

Although an information processing apparatus according to the present invention has been described as a single apparatus, i.e., the recording/playback apparatus 1, in the embodiment described above, the present invention is not limited to the embodiment shown in FIG. 1, and various other embodiments are possible.

Figure 7:
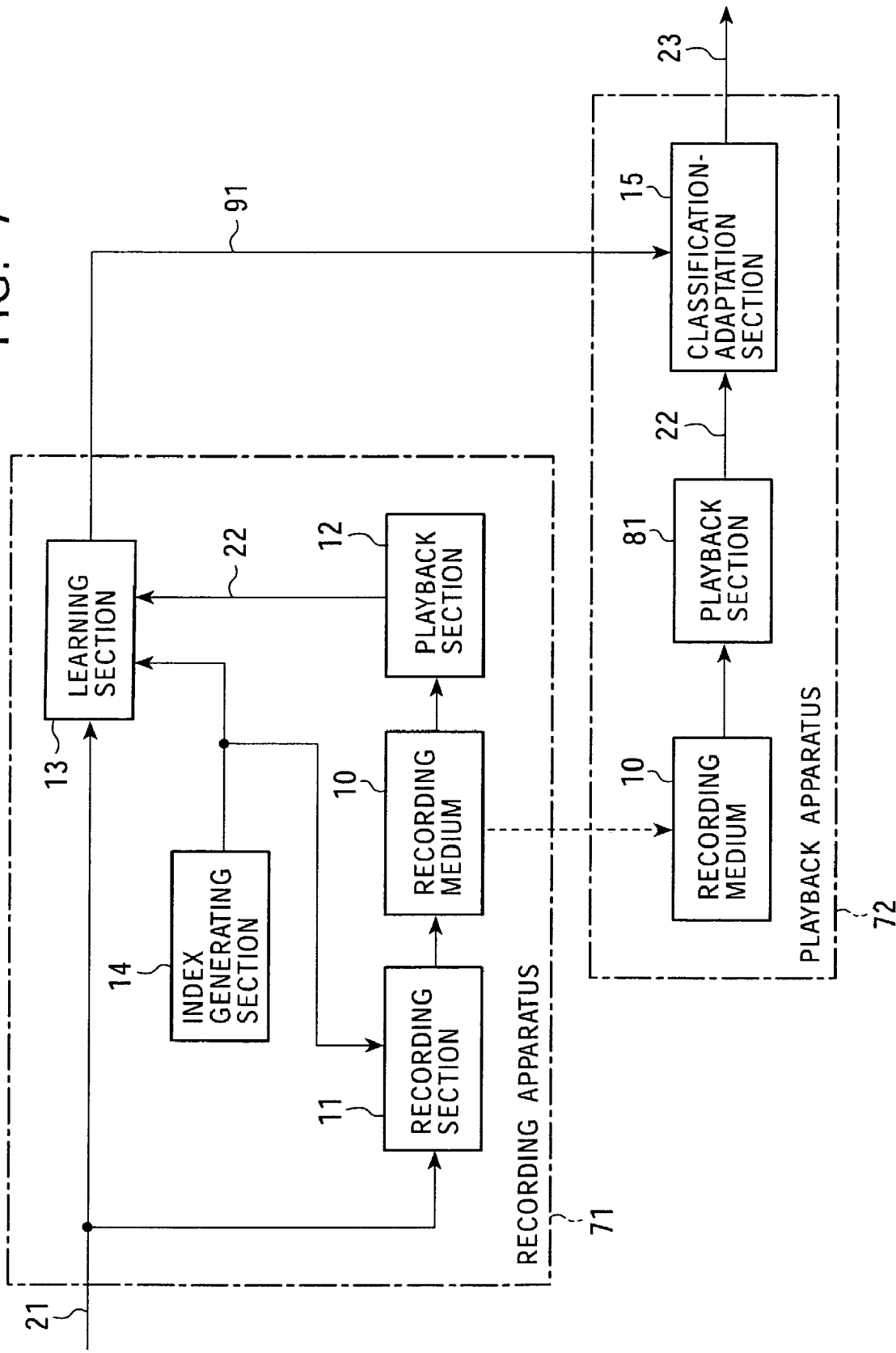
FIG. 7 is a block diagram showing example configurations of a recording apparatus and a playback apparatus according to an embodiment of the present invention.
Figure 8:
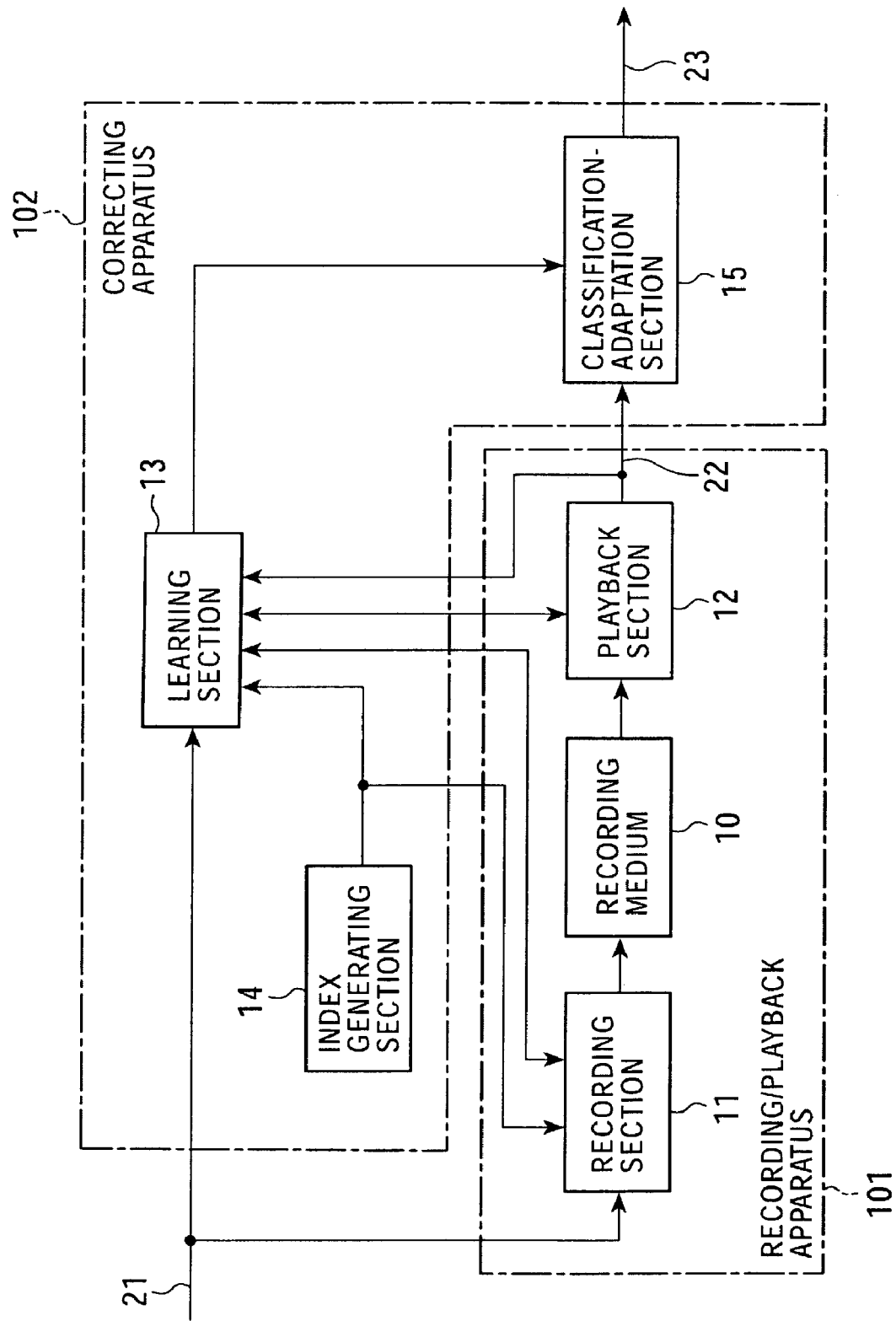
FIG. 8 is a block diagram showing an example configuration of a correcting apparatus according to an embodiment of the present invention.
Figure 9:
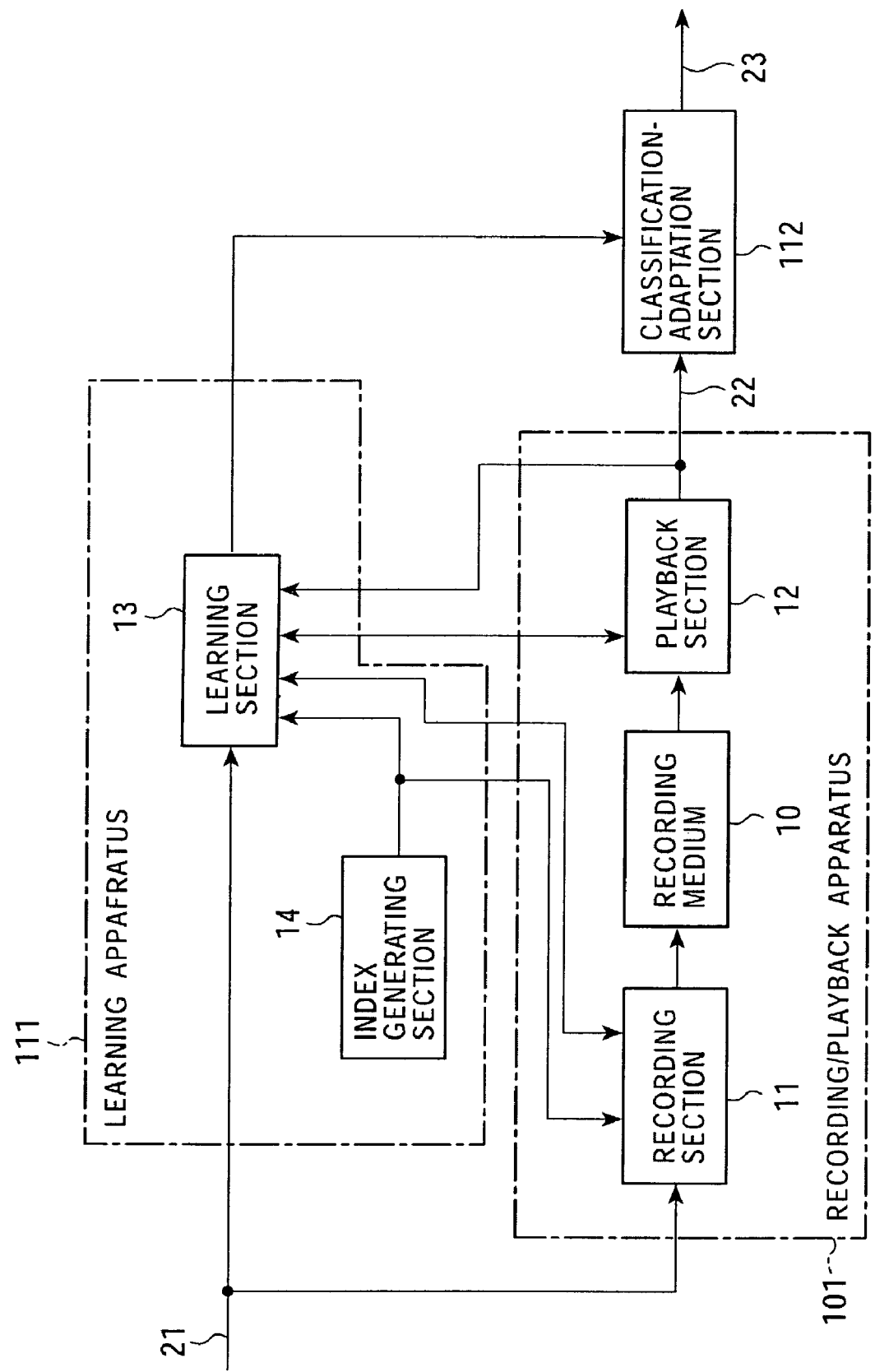
FIG. 9 is a block diagram showing example configurations of a learning apparatus and a classification-adaptation apparatus according to an embodiment of the present invention.

FIGS. 7 to 9 shows other embodiments of the present invention.

FIG. 7 shows an embodiment in which the recording/playback apparatus 1 shown in FIG. 1 is separated into a recording apparatus 71 for recording an input signal 21 on a recording medium 10 and a playback apparatus 72 for playing back the input signal 21 recorded on the recording medium 10 by the recording apparatus 71. In FIG. 7, parts corresponding to those in the recording/playback apparatus 1 shown in FIG. 1 are denoted by the same numerals.

Referring to FIG. 7, the recording medium 71 includes the recording section 11, the playback section 12, the learning section 13, and the index generating section 14 described earlier. The playback apparatus 72 includes a playback section 81, and a classification-adaptation section 15 described earlier.

The playback section 81 need not be configured the same as the playback section 12 described earlier, as long as it is capable of playing back the input signal 21 recorded on the recording medium 10 by the recording section 11 of the recording apparatus 71.

The method of providing the recording medium 10 on which the input signal 21 has been recorded by the recording section 11 of the recording apparatus 71 to the playback apparatus 72 is not limited to a particular method. In the embodiment shown in FIG. 7, a user removes the recording medium 10 mounted on the recording apparatus 71, and mounts the recording medium 10 on the playback apparatus 72.

Furthermore, the method of providing a prediction-coefficient set generated by the learning section 13 is not limited to a particular method. In the embodiment shown in FIG. 7, a prediction-coefficient set is provided from the recording apparatus 71, i.e., the learning section 13, to the playback apparatus 72, i.e., the classification-adaptation section 15, for example, via a network 91 including connecting cables. Alternatively, however, since a prediction-coefficient set can be recorded on the recording medium 10 as described earlier, a prediction-coefficient set may be provided from the recording apparatus 71 to the playback apparatus 72 via the recording medium 10.

FIG. 8 shows an embodiment in which a correcting apparatus 102 is connected to a recording/playback apparatus 101, that is, in which the correcting apparatus 102 is provided as an adaptor connected to the recording/playback apparatus 101. In FIG. 8, parts corresponding to those in the recording/playback apparatus 1 shown in FIG. 1 are denoted by the same numerals.

The configuration of the recording/playback apparatus 101 is not limited to a particular configuration as long as the recording section 11 and the playback section 12 described earlier are included as shown in FIG. 8. For example, the recording/playback apparatus 101 may be implemented as a VTR or a DVD (digital versatile disk) recorder for recording and playing back television broadcast signals, a CD (compact disk) recorder or an MD (mini-disk) recorder for recording and playing back audio signals such as music, or a personal computer that is capable of recording and playing back various types of content signals without limitation to image signals and audio signals.

Although not shown, the recording/playback apparatus 101 may be separated into a recording apparatus including the recording section 11 and a playback apparatus including the playback section 12.

The correcting apparatus 102 according to this embodiment includes the learning section 13, the index generating section 14, and the classification-adaptation section 15 described earlier.

The learning section 13 of the correcting apparatus 102 (i.e., the learning section 13 shown in FIG. 8) additionally has the capability of exchanging various information with the recording section 11 and the playback section 12 of the recording/playback apparatus 101 as compared with the learning section 13 in the two embodiments described earlier (i.e., the learning sections 13 shown in FIGS. 1 and 7).

More specifically, when an input signal 21 is recorded on the recording medium 10 by the recording section 11 of the recording/playback apparatus 101, the learning section 13 of the correcting apparatus 102 detects that the input signal 21 has been recorded, and controls the playback section 12 so that the input signal 21 will be played back from the recording medium 10 and a corresponding playback signal 22 will be output to the learning section 13 of the correcting apparatus 102.

FIG. 9 shows an embodiment in which the correcting apparatus 102 shown in FIG. 8 is separated into a learning apparatus 111 including the learning section 13 and the index generating section 14, and a classification-adaptation apparatus 112 corresponding to the classification-adaptation section 15. In FIG. 9, parts corresponding to those in the recording/playback apparatus 1 shown in FIG. 1 are denoted by the same numerals.

More specifically, when an input signal 21 is recorded on the recording medium 10 by the recording section 11 of the recording/playback apparatus 101, the learning section 13 of the learning apparatus 111 (i.e., the learning section 13 shown in FIG. 9), similarly to the learning section 13 of the correcting apparatus 102 (i.e., the learning section 13 shown in FIG. 8), detects that the input signal 21 has been recorded, and controls the playback section 12 so that the input signal 21 will be played back from the recording medium 10 and a corresponding playback signal 22 will be output to the learning section 13 of the learning apparatus 111.

The classification-adaptation apparatus 112 can be applied to the recording/playback apparatus 101 with recording and playback capabilities, as shown in FIG. 9, and also to an information processing apparatus dedicated for playback only, although not shown.

As described above, in an information processing apparatus according to the present invention (e.g., the recording/playback apparatus 1 shown in FIG. 1, the recording apparatus 71 shown in FIG. 7, the playback apparatus 72 shown in FIG. 7, the correcting apparatus 102 shown in FIG. 8, the learning apparatus 111 shown in FIG. 9, or the classification-adaptation apparatus 112 shown in FIG. 9, described above), when an input signal is recorded, the recorded signal is played back immediately, and characteristics of the input signal and a corresponding playback signal are learned in real time and results of learning (i.e., prediction coefficients) are used. Accordingly, degradation of a signal attributable to disturbance during recording or playback, performance of a recording/playback apparatus, or recording/playback method of a recording/playback apparatus or a recording medium is suppressed.

Furthermore, in an information processing apparatus according to the present invention, optimal prediction coefficients for a recording signal are generated by learning. Accordingly, regardless of which recording apparatus among a plurality of apparatus has recorded an input signal, the effect of performance variation among the recording apparatuses is cancelled.

The series of processing steps described above may be executed either by hardware or by software.

Figure 10:
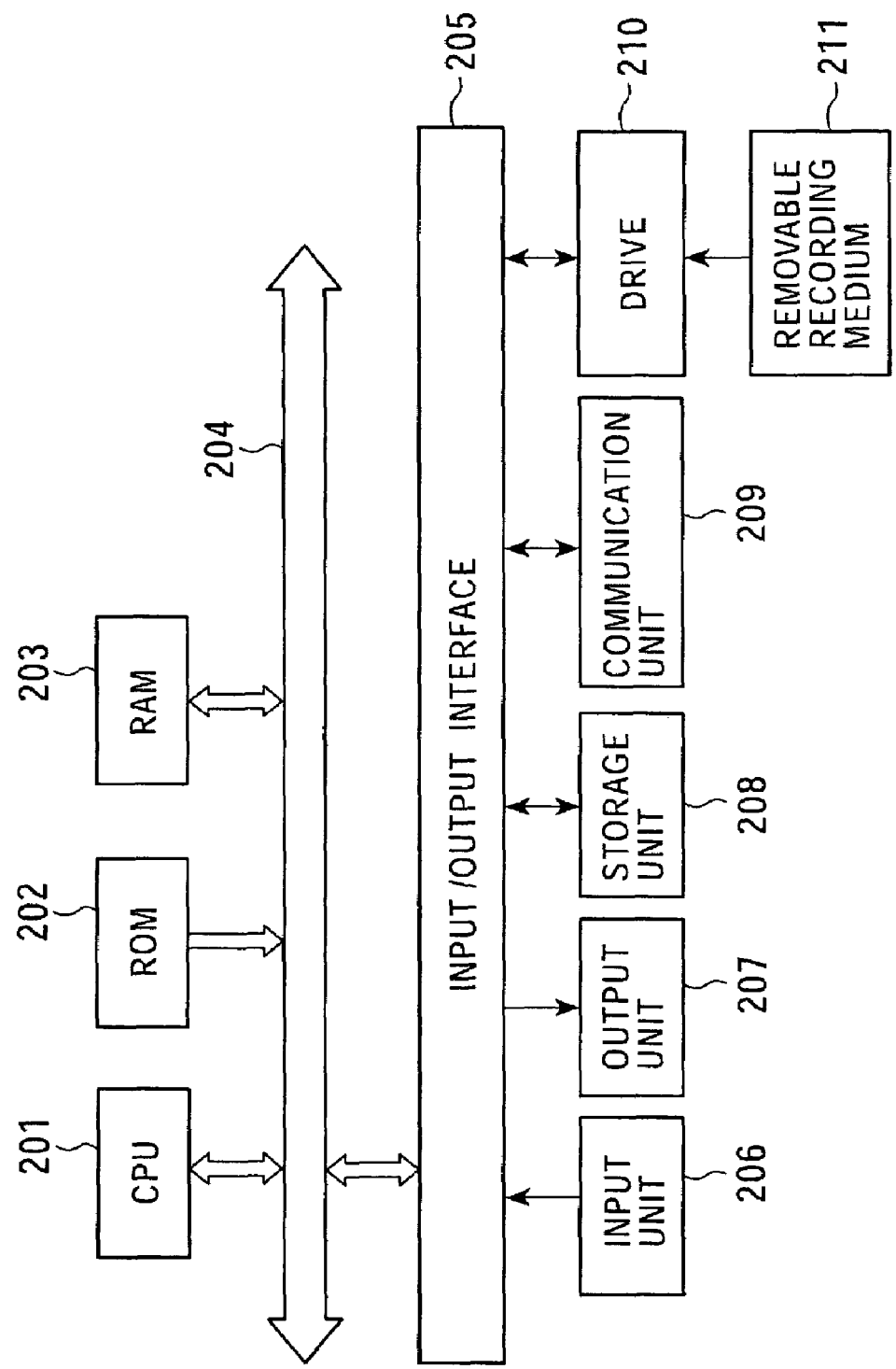
FIG. 10 is a block diagram showing an example configuration of an information processing apparatus according to an embodiment of the present invention.

The various information processing apparatuses described above are implemented, for example, by a personal computer shown in FIG. 10.

Referring to FIG. 10, a CPU (central processing unit) 201 executes various processes according to programs recorded on a ROM (read-only memory) 202 or programs loaded from a storage unit 208 into a RAM (random access memory) 203. The RAM 203 also stores, as required, data needed by the CPU 201 to execute various processes.

The CPU 201, the ROM 202, and the RAM 203 are connected to each other via a bus 204. Also, an input/output interface 205 is connected to the bus 204.

The input/output interface 205 is connected to an input unit 206 including a keyboard and a mouse, an output unit 207 including a display, and a storage unit 208 implemented, for example, by a hard disk, and to a communication unit 209 implemented, for example, by a modem or a terminal adaptor. The communication unit 209 executes communications with other information processing apparatuses via networks including the Internet.

The input/output interface 205 is connected to a drive 210 as required. On the drive 210, a removable recording medium such as a magnetic disk, an optical disk, a magneto-optical disk, or a semiconductor memory is mounted as required, and a computer program read therefrom is installed on the storage unit 208 as required.

When the series of processing steps is executed by software, a program constituting the software is installed via a network or from a recording medium onto a computer embedded in special hardware or, for example, onto a general-purpose personal computer that is capable of executing various functions with various programs installed thereon.

The recording medium may be the removable recording medium (package medium) 211 that is distributed to a user separately from an apparatus, such as a magnetic disk (including a floppy disk), an optical disk (including a CD-ROM (compact disc read-only memory) and a DVD (digital versatile disk)), a magneto-optical disk (including an MD (minidisc)), or a semiconductor memory, as shown in FIG. 10. Alternatively, the recording medium may be the ROM 202 or the hard disk included in the storage unit 208, which is distributed to a user as included in an apparatus.

It is to be understood that, according to the present invention, steps of the program recorded on the recording medium are not limited to processing steps executed sequentially in the described order, and may include processing steps executed in parallel or individually.

What is claimed is:

1. An information processing apparatus for correcting a playing back signal comprising:

learning means for generating, based on a first signal and a second signal, coefficients for correcting the second signal; and index attaching means for attaching an index being generated based on the first signal and being used for detecting coefficients for correcting the second signal during playback to the coefficients generated by the learning means and attaching the index to the first signal associated with the coefficients, wherein the first signal is an original signal prior to being recorded on a recording medium, and the second signal is obtained by playing back the first signal for a first time after the first signal is recorded on the recording medium, and wherein correction of the second signal based on the generated coefficients corrects the second signal into the original signal so that degradation of the playing back signal is reduced.

2. An information processing apparatus according to claim 1, further comprising:

recording means for recording the first signal on the recording medium;

playback means for playing back the first signal recorded on the recording medium to output the second signal; and coefficient recording means for recording the coefficients.

3. An information processing apparatus according to claim 1, further comprising:

correcting means for correcting the second signal based on the coefficients generated by the learning means and to which the index associated with the first signal has been attached by the index attaching means, when the first signal recorded on the recording medium is played back to output the second signal after the coefficients have been generated by the learning means.

4. An information processing apparatus according to claim 3, further comprising:

recording means for recording the first signal and the index on the recording medium; and playback means for playing back the first signal from the recording medium to output the second signal.

5. An information processing apparatus according to claim 1, further comprising:

playback control means for exercising control so that, when the first signal has been recorded on the recoding medium by a first information processing apparatus, the first information processing apparatus immediately plays back the first signal recorded on the recording medium.

6. An information processing apparatus according to claim 5, further comprising:
correcting means for correcting the second signal played back by a second information processing apparatus, based on the coefficients generated by the learning means, when the first signal recorded by the first information processing apparatus is played back from the recording medium by the second information processing apparatus after the prediction coefficients have been generated by the learning means.

7. An information processing apparatus according to claim 5,
wherein the first information processing apparatus and the second information processing apparatus are implemented as a single information processing apparatus that is capable of both recording and playing back a signal.

8. An information processing apparatus according to claim 1,
wherein the learning means comprises:
class determining means for determining a class of the second signal;
equation generating means for generating equations associated with the class determined by the class determining means;
coefficient calculating means for calculating the coefficients based on the equations generated by the equation generating means; and
coefficient storing means for storing the coefficients calculated by the coefficient calculating means.

9. An information processing apparatus according to claim 8,
wherein the prediction coefficients in the coefficient storing means are stored in association with the class.

10. An information processing apparatus according to claim 9, further comprising:
correcting means for correcting the second signal when the first signal recorded on the recording medium is output as the second signal by the playback means after the coefficients have been generated by the learning means,
wherein the correcting means comprises:
class determining means for determining a class of the second signal;
coefficient reading means for reading the coefficients associated with the class determined by the class determining means from the coefficient storing means; and
calculating means for performing a calculation using the coefficients that have been read and the second signal to generate a third signal.

11. An information processing method for correcting a playing back signal, comprising:
a learning step of generating, based on a first signal and a second signal, coefficients for correcting the second signal; and
an index attaching step of attaching an index being generated based on the first signal and being used for detecting coefficients for correcting the second signal during playback to the coefficients generated in the learning step and attaching the index to the first signal associated with the coefficients,
wherein the first signal is an original signal prior to being recorded on a recording medium, and the second signal is obtained by playing back the first signal for a first time after the first signal is recorded on the recording medium, and
wherein correction of the second signal based on the generated coefficients corrects the second signal into the original signal so that degradation of the playing back signal is reduced.

12. An information processing method according to claim 11, further comprising:
a recording step of recording the first signal on the recording medium;
a playback step of playing back the first signal recorded on the recording medium to output the second signal; and
a coefficient recording step of recording the coefficients.

13. An information processing method according to claim 11, further comprising:
a correcting step of correcting the second signal based on the coefficients generated in the learning step, when the first signal recorded on the recording medium is played back to output the second signal after the coefficients have been generated in the learning step.

14. A recording medium having recorded thereon a program for a computer that when executed by the computer controls an information processing apparatus, the program comprising:
a learning step of generating, based on a first signal and a second signal, coefficients for correcting the second signal; and
an index attaching step for attaching an index being generated based on the first signal and being used for detecting coefficients for correcting the second signal during playback to the coefficients generated in advance and attaching the index to the first signal associated with the coefficients,
wherein the first signal is an original signal prior to being recorded on a recording medium, and the second signal is obtained by playing back the first signal for a first time after the first signal is recorded on the recording medium, and
wherein correction of the second signal based on the generated coefficients corrects the second signal into the original signal so that degradation of the playing back signal is reduced.

15. A recording medium according to claim 14, wherein the program further comprises:
a correcting step of correcting the second signal based on the coefficients generated in the learning step, when the first signal recorded on the recording medium is played back to output the second signal after the coefficients have been generated in the learning step.

16. An information processing apparatus for correcting a playing back signal comprising:
correcting means for detecting coefficients generated in advance based on a first signal and a second signal and correcting the second signal based on the coefficients detected, when the first signal is played back to output the second signal after the first signal has been recorded on a recording medium; and
index attaching means for attaching an index being generated based on the first signal and being used for detecting coefficients for correcting the second signal during playback to the coefficients generated in advance and attaching the index to the first signal associated with the coefficients,
wherein the first signal is an original signal prior to being recorded on a recording medium, and the second signal is obtained by playing back the first signal for a first time after the first signal is recorded on the recording medium, and wherein correction of the second signal based on the generated coefficients corrects the second signal into the original signal so that degradation of the playing back signal is reduced.

17. An information processing apparatus according to claim 16, wherein the index for associating the first signal and the coefficients is recorded on the recording medium, and wherein the correcting means detects the coefficients associated with the first signal based on the index and corrects the second signal based on the coefficients detected.

18. An information processing apparatus according to claim 16, wherein the correcting means comprises:

class determining means for determining a class of the second signal;

coefficient detecting means for detecting the coefficients associated with the class determined by the class determining means; and calculating means for performing a calculation needed to correct the second signal, based on the coefficients detected by the coefficient detecting means.

19. An information processing method for correcting a playing back signal, comprising:

a correcting step of detecting coefficients generated in advance based on a first and a second signal and correcting the second signal based on the coefficients detected, when the first signal is played back to output the second signal after the first signal has been recorded on a recording medium; and an index attaching step for attaching an index being generated based on the first signal and being used for detecting coefficients for correcting the second signal during playback to the coefficients generated in advance and attaching the index to the first signal associated with the coefficients, wherein the first signal is an original signal prior to being recorded on a recording medium, and the second signal is obtained by playing back the first signal for a first time after the first signal is recorded on the recording medium, and wherein correction of the second signal based on the generated coefficients corrects the second signal into the original signal so that degradation of the playing back signal is reduced.

20. A recording medium having recorded thereon a program for a computer that when executed by the computer controls an information processing apparatus, the program comprising:

a correcting step of detecting coefficients generated in advance based on a first and a second signal and correcting the second signal based on the coefficients detected, when the first signal is played back to output the second signal after the first signal has been recorded on a recording medium; and an index attaching step for attaching an index being generated based on the first signal and being used for detecting coefficients for correcting the second signal during playback to the coefficients generated in advance and attaching the index to the first signal associated with the coefficients, wherein the first signal is an original signal prior to being recorded on a recording medium, and the second signal is obtained by playing back the first signal for a first time after the first signal is recorded on the recording medium, and wherein correction of the second signal based on the generated coefficients corrects the second signal into the original signal so that degradation of the playing back signal is reduced.

* * * * *

UNITED STATES PATENT AND TRADEMARK OFFICE
CERTIFICATE OF CORRECTION

PATENT NO. : 7,599,607 B2  Page 1 of 1
APPLICATION NO. : 10/431028
DATED : October 6, 2009
INVENTOR(S) : Kondo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this

Twenty-eighth Day of September, 2010

David J. Kappos
*Director of the United States Patent and Trademark Office*